United States Patent
Venkataramani et al.

(10) Patent No.: US 7,328,570 B2
(45) Date of Patent: Feb. 12, 2008

(54) PULSE DETONATION SYSTEM FOR A GAS TURBINE ENGINE HAVING MULTIPLE SPOOLS

(75) Inventors: Kattalaicheri Srinivasan Venkataramani, West Chester, OH (US); Lawrence Butler, Eydon (GB); James Paul Davidson, Mason, OH (US)

(73) Assignee: General Electric Company, Schenectady, NY (US)

( * ) Notice: Subject to any disclaimer, the term of this patent is extended or adjusted under 35 U.S.C. 154(b) by 703 days.

(21) Appl. No.: 10/932,169

(22) Filed: Sep. 1, 2004

(65) Prior Publication Data

US 2006/0042228 A1   Mar. 2, 2006

(51) Int. Cl.
- *F02C 5/02* (2006.01)
- *F02K 3/02* (2006.01)
- *F02K 5/02* (2006.01)

(52) U.S. Cl. .................. 60/39.38; 60/39.38; 60/39.76; 60/39.78; 60/247

(58) Field of Classification Search ............... 60/39.38, 60/39.39, 39.76, 39.78, 772, 247, 226.1
See application file for complete search history.

(56) References Cited

U.S. PATENT DOCUMENTS

| 2,640,314 A | * | 6/1953 | Abel | ............................ 60/247 |
| 5,345,758 A | | 9/1994 | Bussing | ...................... 60/39.38 |
| 5,901,550 A | | 5/1999 | Bussing et al. | ............. 60/39.38 |
| 6,349,538 B1 | | 2/2002 | Hunter, Jr. et al. | ........... 60/204 |
| 6,505,462 B2 | | 1/2003 | Meholic | ..................... 60/39.39 |
| 6,886,325 B2 | * | 5/2005 | Norris et al. | ............... 60/39.34 |
| 6,901,738 B2 | * | 6/2005 | Sammann et al. | .......... 60/226.1 |
| 6,904,750 B2 | * | 6/2005 | Venkataramani et al. | .. 60/226.1 |
| 7,100,360 B2 | * | 9/2006 | Sammann et al. | .......... 60/226.1 |

FOREIGN PATENT DOCUMENTS

| EP | 1435440 A | 7/2004 |
| EP | 1435448 A | 7/2004 |

* cited by examiner

*Primary Examiner*—Charles G. Freay
(74) *Attorney, Agent, or Firm*—William Scott Andes; James P. Davidson, Esq.

(57) ABSTRACT

A gas turbine engine having a longitudinal centerline axis therethrough, including: a fan section at a forward end of the gas turbine engine including at least a first fan blade row connected to a first drive shaft; a booster compressor positioned downstream of the fan section, the booster compressor including a first compressor blade row and a second compressor blade row connected to a second drive shaft and interdigitated with the first compressor blade row; and, a pulse detonation system for powering the first and second drive shafts. The pulse detonation system powers only the second drive shaft during a first designated condition of the gas turbine engine and both the first drive shaft and the second drive shaft during a second designated condition of the gas turbine engine. The first and second drive shafts are powered independently of each other by the pulse detonation system.

21 Claims, 9 Drawing Sheets

PULSE DETONATION SYSTEM FOR A GAS TURBINE ENGINE HAVING MULTIPLE SPOOLS

BACKGROUND OF THE INVENTION

The present invention relates generally to a pulse detonation system for a gas turbine engine and, in particular, to a pulse detonation system which is able to replace the core of a gas turbine engine and separately power the fan and booster compressor thereof.

One type of pulse detonation system which has eliminated the need for a separate valve is disclosed in a patent application entitled "Pulse Detonation Device For A Gas Turbine Engine," having Ser. No. 10/383,027 now U.S. Pat. No. 6,928,804, and being owned by the assignee of the present invention. It will be noted therein that the pulse detonation device includes a stationary air inlet duct and a ring member which rotates therearound. The various events of the detonation take place within detonation ducts associated with the ring member, as air and fuel are injected and a detonation wave is initiated therein. In this configuration, the aft portion of the rotatable ring member is connected to a drive shaft in a cantilevered manner. The air ports, fuel injectors and initiation devices are located adjacent an outer surface of the air inlet duct so as to be sequentially aligned with an inner end of the detonation ducts, which are open at each end, as the ring member rotates.

A second type of pulse detonation system owned by the assignee of the present invention is disclosed in a patent application entitled "Rotating Pulse Detonation System For A Gas Turbine Engine" having Ser. No. 10/422,314, now U.S. Pat. No. 6,931,858. This system discloses a rotatable cylindrical member having a forward surface, an aft surface, and an outer circumferential surface, where a plurality of spaced detonation passages are disposed therethrough. In particular, each detonation passage includes at least a portion thereof with a longitudinal axis extending therethrough oriented at a circumferential angle to a longitudinal centerline axis through the gas turbine engine. The pulse detonation system also includes a shaft rotatably connected to the cylindrical member and a stator is configured in spaced arrangement with the forward surface of the cylindrical member and a portion of the shaft. The stator further includes at least one group of ports formed therein alignable with the detonation passages as the cylindrical member rotates. In this way, detonation cycles are performed in the detonation passages so that combustion gases exit the aft surface of the cylindrical member to create a torque which causes the cylindrical member to rotate.

Another pulse detonation system owned by the assignee of the current invention is disclosed in a patent application entitled "Rotary Pulse Detonation System With Aerodynamic Detonation Passages For Use In A Gas Turbine Engine," having Ser. No. 10/803,293. The pulse detonation system described therein includes a rotatable cylindrical member having a forward surface, an aft surface, and an outer circumferential surface, where at least one stage of circumferentially spaced detonation passages are disposed therethrough. Each detonation passage further includes: a leading portion positioned adjacent the forward surface of the cylindrical member, with the leading portion having a centerline therethrough oriented at a designated angle to an axis extending substantially parallel to the longitudinal centerline axis within a specified plane; a trailing portion positioned adjacent the aft surface of the cylindrical member, with the trailing portion having a centerline therethrough oriented at a designated angle to the axis within the specified plane; and, a middle portion connecting the leading and trailing portions, with the middle portion having a centerline therethrough with a substantially constantly changing slope in the specified plane. A shaft is rotatably connected to the cylindrical member and a stator is configured in spaced arrangement with the forward surface of the cylindrical member and a portion of the shaft. The stator further includes at least one group of ports formed therein alignable with the leading portions of the detonation passages as the cylindrical member rotates. In this way, detonation cycles are performed in the detonation passages so that combustion gases interact therewith to create a torque which causes the cylindrical member to rotate.

While the configurations disclosed by the foregoing patent applications are useful for their intended purpose, it will be seen that in each case a single drive shaft is powered by the particular pulse detonation system. This drive shaft is connected to both the fan section and the booster compressor in a high bypass type gas turbine engine. Due to the high inertia characteristics of the fan, the starting torque required for it is much greater than that for the booster compressor. Thus, the starting systems designed to provide such starting torque are generally larger and less economical than if the booster compressor was started separately from the fan.

Accordingly, it would be desirable for a pulse detonation system to be developed for a gas turbine engine which is able to operate the engine without the need for a separate valve. Further, it would be desirable for such pulse detonation system to be modified so that it is able to separately start the booster compressor from the fan of the gas turbine engine.

BRIEF SUMMARY OF THE INVENTION

In a first exemplary embodiment of the invention, a gas turbine engine having a longitudinal centerline axis therethrough is disclosed as including: a fan section at a forward end of the gas turbine engine including at least a first fan blade row connected to a first drive shaft; a booster compressor positioned downstream of the fan section, the booster compressor including a first compressor blade row and a second compressor blade row connected to a second drive shaft and interdigitated with the first compressor blade row; and, a pulse detonation system for powering the first and second drive shafts. The pulse detonation system powers only the second drive shaft during a first designated condition of the gas turbine engine and both the first drive shaft and the second drive shaft during a second designated condition of the gas turbine engine. The first and second drive shafts are powered independently of each other by the pulse detonation system.

In a second exemplary embodiment of the invention, a method of independently powering separate drive shafts in a gas turbine engine by means of a pulse detonation system is disclosed as including the following steps: providing a first rotatable member with a plurality of detonation areas associated therewith; connecting the first rotatable member to a first drive shaft of the gas turbine engine; providing a second rotatable member with a plurality of detonation areas associated therewith; connecting the second rotatable member to a second drive shaft of the gas turbine engine; producing a torque on the first rotatable member via the performance of pulse detonation cycles in the detonation areas thereof during a first designated condition of the gas turbine engine; and, producing a torque on the first and second rotatable members via the performance of pulse detonation cycles in the detonation areas thereof during a second designated condition of the gas turbine engine.

DETAILED DESCRIPTION OF THE INVENTION

Figure 1:
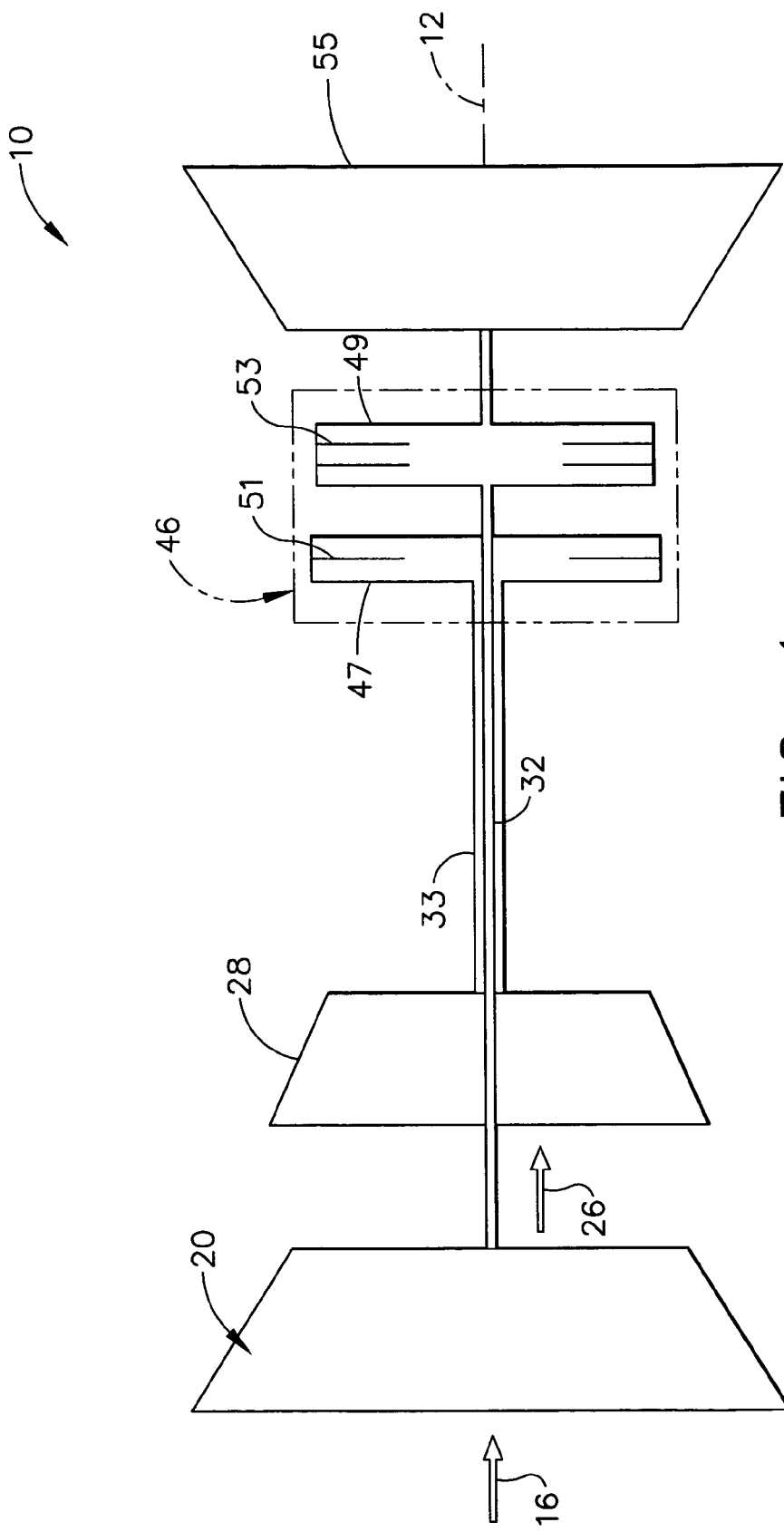
FIG. 1 is a longitudinal schematic view of an aircraft gas turbine engine including a fan section and a booster compressor which are independently powered by a pulse detonation system in accordance with the present invention.

Referring now to the drawings in detail, wherein identical numerals indicate the same elements throughout the figures, FIG. 1 schematically depicts a gas turbine engine 10 utilized with aircraft having a longitudinal or axial centerline axis 12 therethrough for reference purposes. It will be understood from the exemplary embodiment of FIG. 2 that gas turbine engine 10 preferably includes a nacelle 14 to assist in directing a flow of air (represented by arrow 16) through an inlet 18 to a fan section 20 as is well known. Air flow 16 is then split downstream of fan section 20 so that a first portion (represented by arrow 22) flows through an outer duct 24 and a second portion (represented by arrow 26) is provided to a booster compressor 28. A first fan blade row 44 is preferably connected to a first drive shaft 32. It will be understood that booster compressor 28 preferably includes at least a first compressor blade row 30, which preferably is stationary, and a second compressor blade row 34 connected to a second drive shaft 33 and interdigitated with first compressor blade row 30. It will be appreciated that additional compressor blade rows 36 and 38 may also be connected to second drive shaft 33, with additional stationary compressor blade rows 40 and 42 being interdigitated therewith, respectively. First and second drive shafts 32 and 33, respectively, are powered by means of a pulse detonation system 46 in accordance with the present invention.

It will be understood that pulse detonation system 46 will preferably initially power only second drive shaft 33 during a first designated condition of gas turbine engine 10 (e.g., start-up of gas turbine engine 10). Because second drive shaft 33 serves to cause the rotation of booster compressor 28, the much higher starting torque required by fan section 20 need not be extracted from pulse detonation system 46 during this first designated condition of gas turbine engine 10. Once booster compressor 28 rotates at a predetermined rotational speed (i.e., a second designated operating condition of gas turbine engine 10), pulse detonation system 46 is then preferably utilized to power first drive shaft 32 and cause rotation of fan section 20, as well as second drive shaft 33. By powering second drive shaft 33 first, it will be appreciated that booster compressor 28 can supply the compressed air required by pulse detonation system 46 when the higher starting torque of fan section 20 is required. Due to their coaxial relation, first and second drive shafts 32 and 33 are able to be driven independently.

While pulse detonation system 46 may be configured in any of several different ways, it will generally be understood from FIG. 1 that a first rotatable section 47 is provided for powering second drive shaft 33 and a second rotatable section 49 is provided for powering first drive shaft 32. First rotatable section 47 will typically be located upstream of second rotatable section 49, although the connection of first and second drive shafts 32 and 33 with pulse detonation system 46 may allow first rotatable section 47 to be located downstream of second rotatable section 49.

First rotatable section 47 will generally include a single stage 51, but may include additional stages depending upon the starting requirements of booster compressor 28 and the torque produced by each such stage of first rotatable section 47. In light of the higher starting torque required by fan section 20, second rotatable section 49 typically will have a plurality of stages 53 incorporated therewith. By having a number of stages 53, it will be appreciated that second rotatable section 49 of pulse detonation system 46 can be tuned to the requirements of operating gas turbine engine 10 during any particular point in the engine cycle while maximizing the efficiency of pulse detonation system 46. This is accomplished through the performance of detonation cycles within only those stages of second rotatable section 49 (and possibly only portions of such stages) that are needed to accomplish the desired torque in fan section 20.

Although not required, gas turbine engine 10 may further include a turbine 55 positioned aft of and in flow communication with pulse detonation system 46. Such turbine 55 would also preferably be connected to first drive shaft 32 so as to assist in powering fan section 20. Turbine 55 would therefore preferably be driven by the gas products exiting pulse detonation system 46 and, particularly, second rotatable section 49. Implementation of turbine 55 with pulse detonation system 46 would serve to increase the efficiency of gas turbine engine 10 instead of merely allowing the products from pulse detonation system to exit unused.

Figure 2:
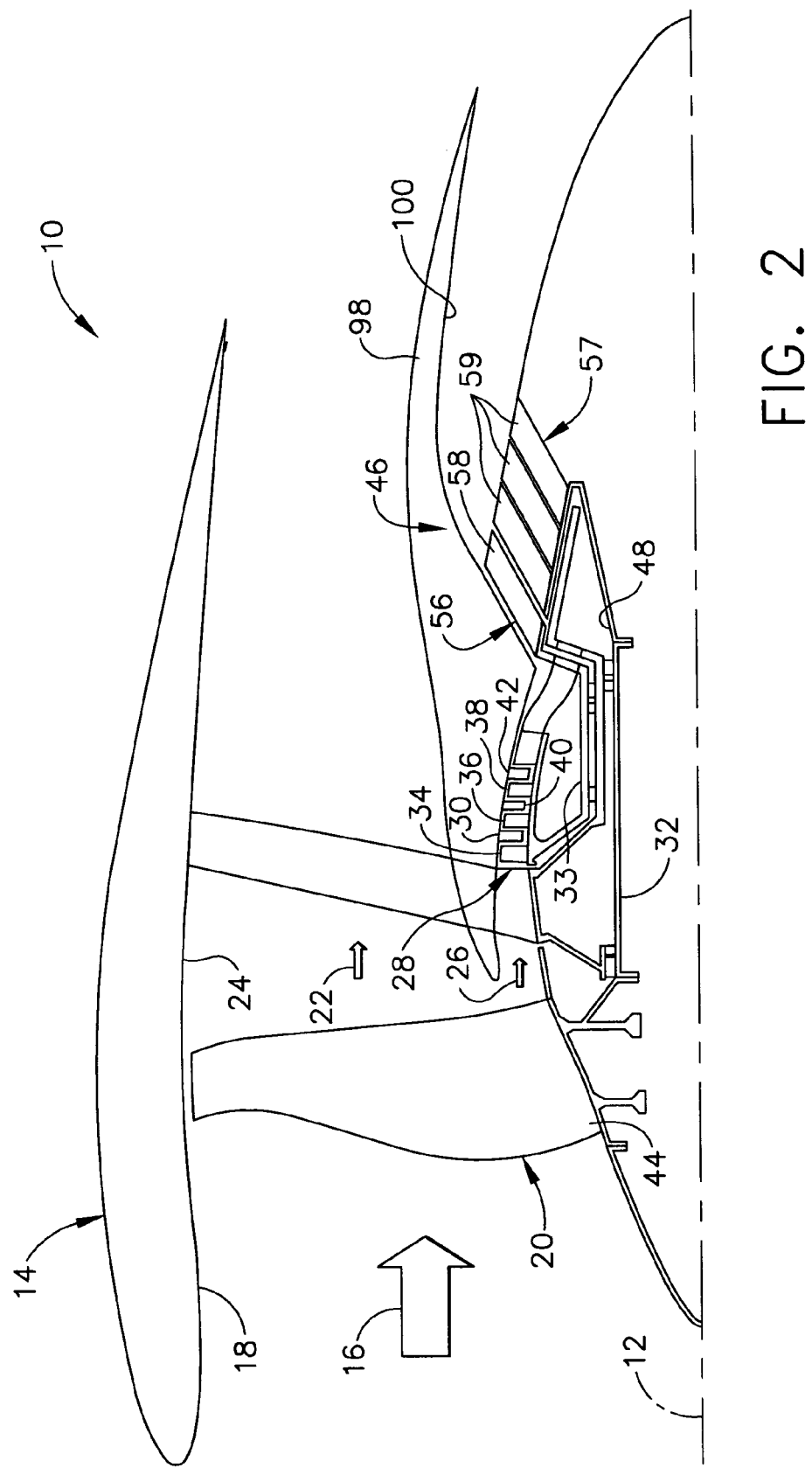
FIG. 2 is a longitudinal cross-sectional view of an aircraft gas turbine engine like that depicted in FIG. 1 including a pulse detonation system having a first exemplary embodiment.
Figure 3:
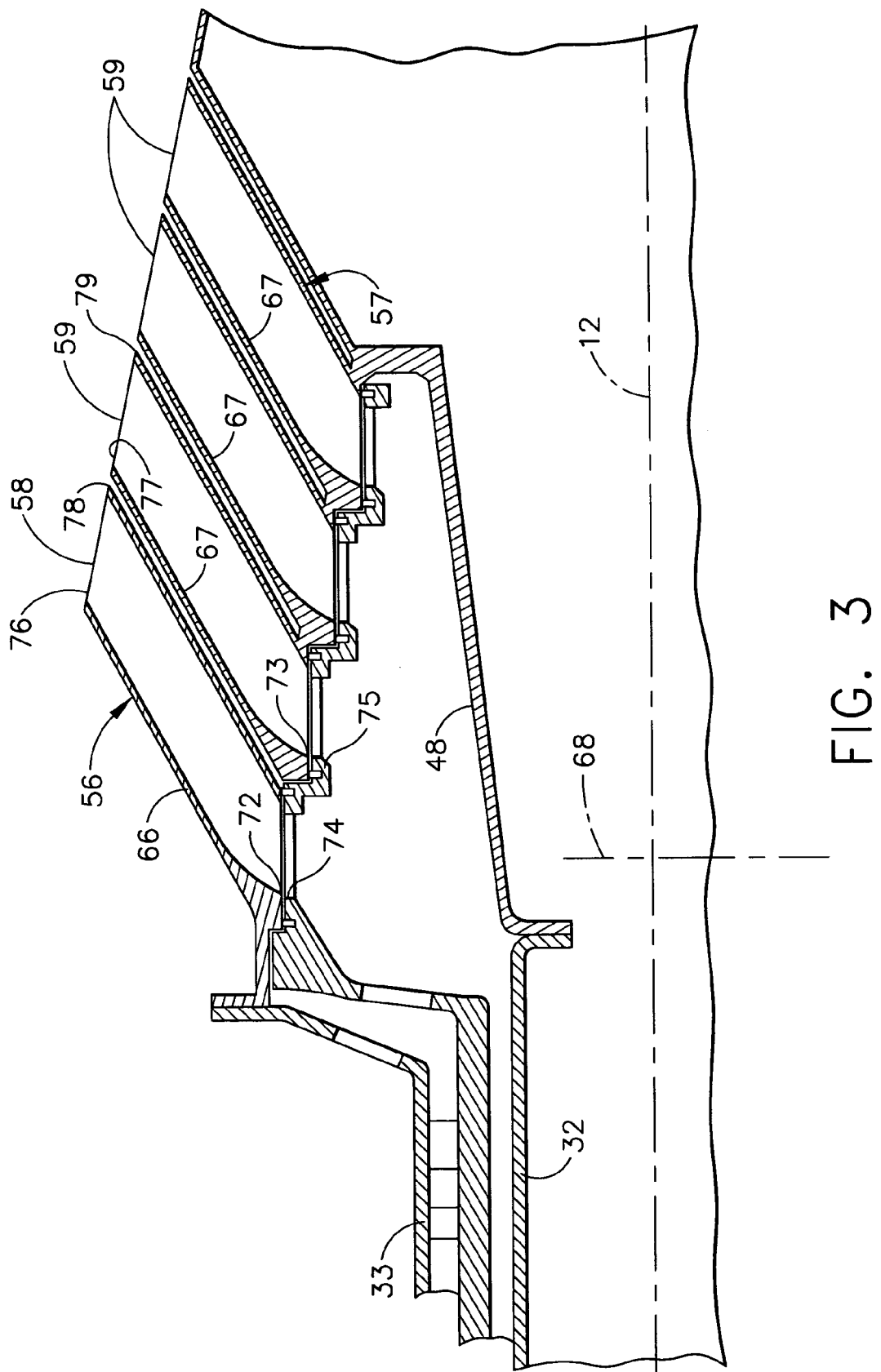
FIG. 3 is an enlarged, partial longitudinal cross-sectional view of the pulse detonation system depicted in FIG. 2.
Figure 4:
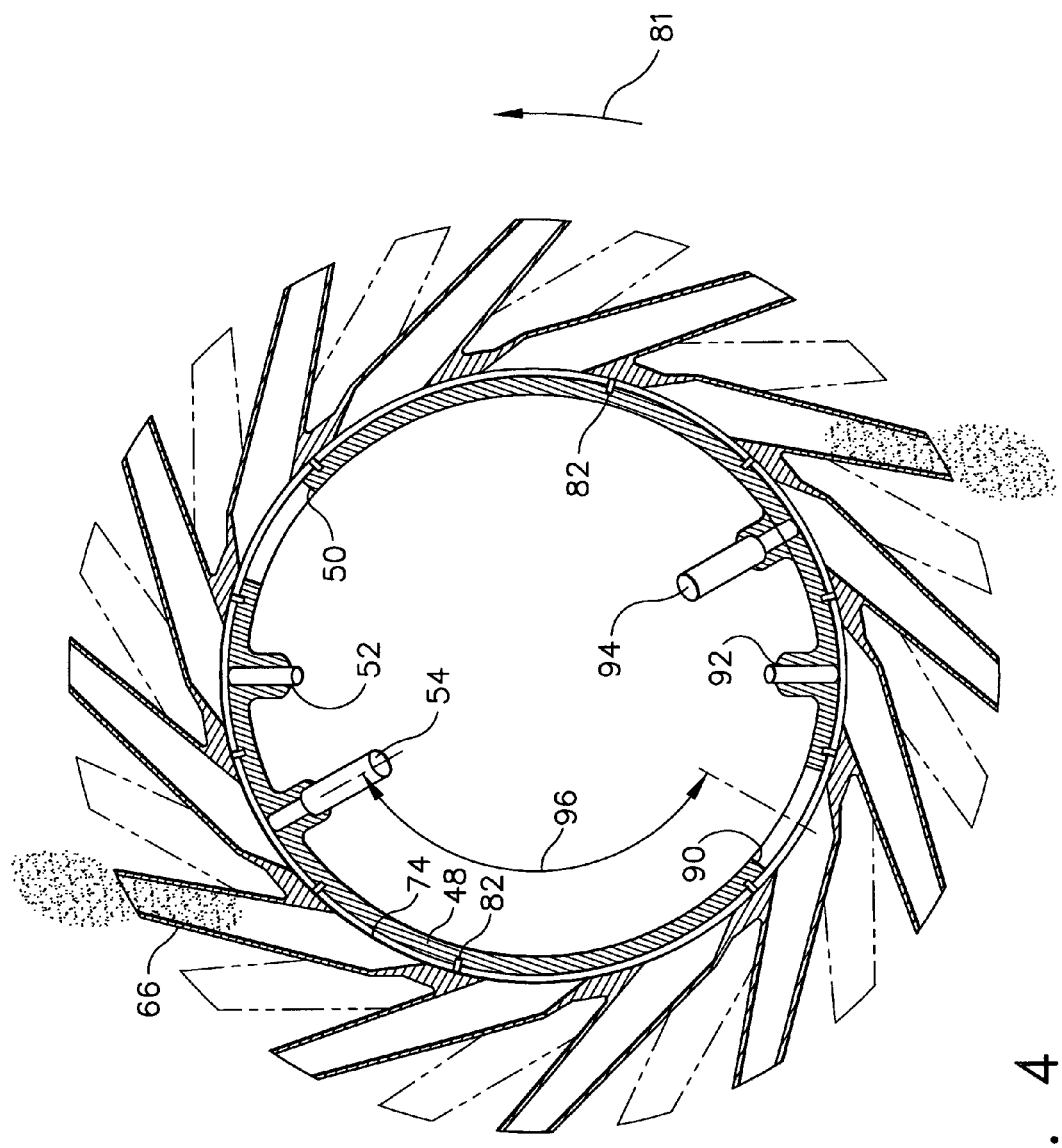
FIG. 4 is a front view of the first rotatable ring member depicted in FIGS. 2 and 3.

One exemplary embodiment for pulse detonation system 46 is generally described in the '027 patent application, which is hereby incorporated by reference. More specifically, as seen in FIGS. 2–4, this configuration of pulse detonation system 46 includes an air inlet duct 48 which is positioned so as to be in flow communication with booster compressor 28. Air inlet duct 48 includes at least one port 50 formed therein for permitting compressed air received from booster compressor 28 to flow therethrough. In addition, a fuel injector 52 is mounted to air inlet duct 48 in circumferentially spaced relation to each port 50 and a device 54 is mounted to air inlet duct 48 in circumferentially spaced relation to each fuel injector 52 for initiating detonation waves. It will be appreciated that initiation device 54 may include, for example, an igniter (e.g., a high energy spark plug, a torch igniter having separate fuel and oxidizer, or a plasma jet igniter), a laser, or a shock focus device.

A first rotatable ring member 56 (corresponding to first rotatable member 47 in FIG. 1) is preferably positioned in coaxial relation (with respect to centerline longitudinal axis 12) around an upstream portion of air inlet duct 48. First rotatable ring member 56 includes at least one detonation stage 58 disposed therein, although additional detonation stages may be provided therein in spaced axial relation downstream of detonation stage 58 depending upon the torque requirements of booster compressor 28. Similarly, a second rotatable ring member 57 (corresponding to second rotatable member 49 in FIG. 1) is preferably positioned in coaxial relation around a downstream portion of air inlet duct 48. Second rotatable ring member 57 preferably includes a plurality of detonation stages 59 disposed therein in spaced axial relation due to the high starting torque requirements of fan section 20.

Each detonation stage of first rotatable ring member 56 and second rotatable ring member 57 preferably has a plurality of circumferentially spaced detonation ducts 66 and 67, respectively, extending tangentially from an inner surface 74 of first rotatable ring member 56 and an inner surface 75 of second rotatable ring member 57 in a distinct radial plane. It is also preferred that first and second rotatable ring members 56 and 57 be hollow between each adjacent detonation duct 66 and each adjacent detonation duct 67 so as to reduce weight, thereby giving detonation ducts 66 and 67 a tube-like appearance. In order to provide added stability, various connections may be provided between adjacent detonation ducts 66 and between adjacent detonation ducts 67. An alternative configuration may involve a ring member having tubes attached to an outer surface thereof.

It will be understood that while detonation ducts 66 and 67 of each detonation stage 58 and 59, respectively, may be oriented substantially perpendicular to and offset from longitudinal centerline axis 12, it is preferred that detonation ducts 66 and 67 be angled rearward with respect to an axis 68 substantially perpendicular to longitudinal centerline axis 12. In this way, the flow of combustion gases exiting detonation ducts 66 and 67 is able to provide a forward thrust component while minimizing turning losses. It will also be seen that each detonation duct 66 extends from a first end or inlet 72 adjacent an inner surface 74 of first rotatable ring member 56 to a second end or outlet 76 adjacent an outer surface 78 of first rotatable ring member 56, while each detonation duct 67 extends from a first end or inlet 73 adjacent an inner surface 75 of second rotatable ring member 57 to a second end or outlet 77 adjacent an outer surface 79 of second rotatable ring member 57. It will be appreciated that inlets 72 and 73 are somewhat larger due to the tangential arrangement of detonation ducts 66 and 67 to ring member inner surfaces 74 and 75, as well as the relative motion between first and second rotatable ring members 56 and 57 and air inlet duct 48. Nevertheless, each of detonation ducts 66 and 67 is preferably linear with a substantially circular cross-section having a substantially constant diameter after inlets 72 and 73 to outlets 76 and 77. Each of detonation ducts 66 and 67 may have a substantially convergent diameter for at least a portion thereof to accomplish quick transition to detonation. Of course, the geometry of detonation ducts 66 and 67 may be tailored for the particular application (i.e., depending on the type of fuel used) or other constraints due to space or weight.

Detonation ducts 66 and 67 for each detonation stage of first and second rotatable ring member 56 and 57 may also be substantially aligned circumferentially when viewed along longitudinal centerline axis 12. While this configuration may ease manufacture and maintenance, it is contemplated that staggering of such detonation ducts 66 and 67 circumferentially between detonation stages may assist in reducing the noise generated by pulse detonation system 46.

Regardless of the configuration utilized for detonation ducts 66 and 67, it will be appreciated that detonation ducts 66 and 67 of each detonation stage are aligned with air port 50, fuel injector 52, and detonation initiation device 54 in a predetermined timing and sequence so that a detonation wave is produced therein. This is also evidenced by the direction of rotation for first rotatable ring member 56, as represented by arrow 81 in FIG. 4. Combustion gases then follow each detonation wave, the momentum of which produces a force that creates a torque on first and second rotatable ring members 56 and 57 due to the eccentric orientation of detonation ducts 66 and 67. This torque causes ring members 56 and 57 to rotate. Prior to the detonation cycle taking place (i.e., the injection of fuel and initiation of a detonation wave in detonation ducts 66 and 67), however, it is preferred that first rotatable ring member 56 rotate at a predetermined speed. This is caused by the compressed air being supplied to detonation ducts 66 and 67 through air port 50. It is also preferred that detonation ducts 66 and 67 not be in communication with air inlet duct 48 while detonation (and the consequent pressure rise) occurs therein. In this way, booster compressor 28 and fan section 20 are isolated from the high pressure therein and thereby avoids stall or surge.

It will be appreciated that compressed air will preferably be supplied in each detonation duct 66 and 67, but that fueling and/or initiation of a detonation wave may or may not occur in each successive detonation duct 66 and 67 depending upon the power required from pulse detonation system 46 and whether a buffer or delay is desired between detonations. Accordingly, devices (not shown) are preferably provided to control the supply of fuel through a manifold to fuel injectors 52 and the initiation of detonation waves in detonation ducts 66 by initiation device 54.

In order to prevent compressed air or fuel from leaking between adjacent detonation ducts 66 and 67, a plurality of seals 82 (e.g., floating rubbing contact seals) are preferably positioned between air inlet duct 48 and inner surfaces 74 and 75, respectively, of first and second rotatable ring members 56 and 57.

It is also preferred that a plurality of detonation cycles occur in each detonation duct 66 and 67 of detonation stages 58 and 59 during each revolution of rotatable ring members 56 and 57. Accordingly, at least one additional sequence of an additional air port 90 circumferentially spaced from initiation device 54, an additional fuel injector 92 circumferentially spaced from air port 90, and an additional device 94 circumferentially spaced from fuel injector 92 for initiating detonation waves are provided in or mounted to air inlet duct 48. It will be appreciated that a designated circumferential spacing 96 is provided between additional air port 90 and initiation device 94 so as to provide substantial symmetry between detonation sequences in any detonation stage. Of course, this will be dependent upon the overall number of detonation sequences (with the associated air port, fuel injector and ignition device) provided in a given detonation stage.

As seen in FIG. 2 with respect to gas turbine engine 10, a nozzle plenum 98 is preferably positioned with respect to first and second ring members 56 and 57 (and outlets 76 and 77 of detonation ducts 66 and 67) so as to be in flow communication with the combustion gases exiting there-from. In this way, additional thrust is produced through an exit nozzle 100. Further, at least one turbine stage (not shown) may be positioned in flow communication with nozzle plenum 98. Such turbine stage may be connected to drive shaft 32 or another drive shaft so as to produce additional thrust or work.

Figure 5:
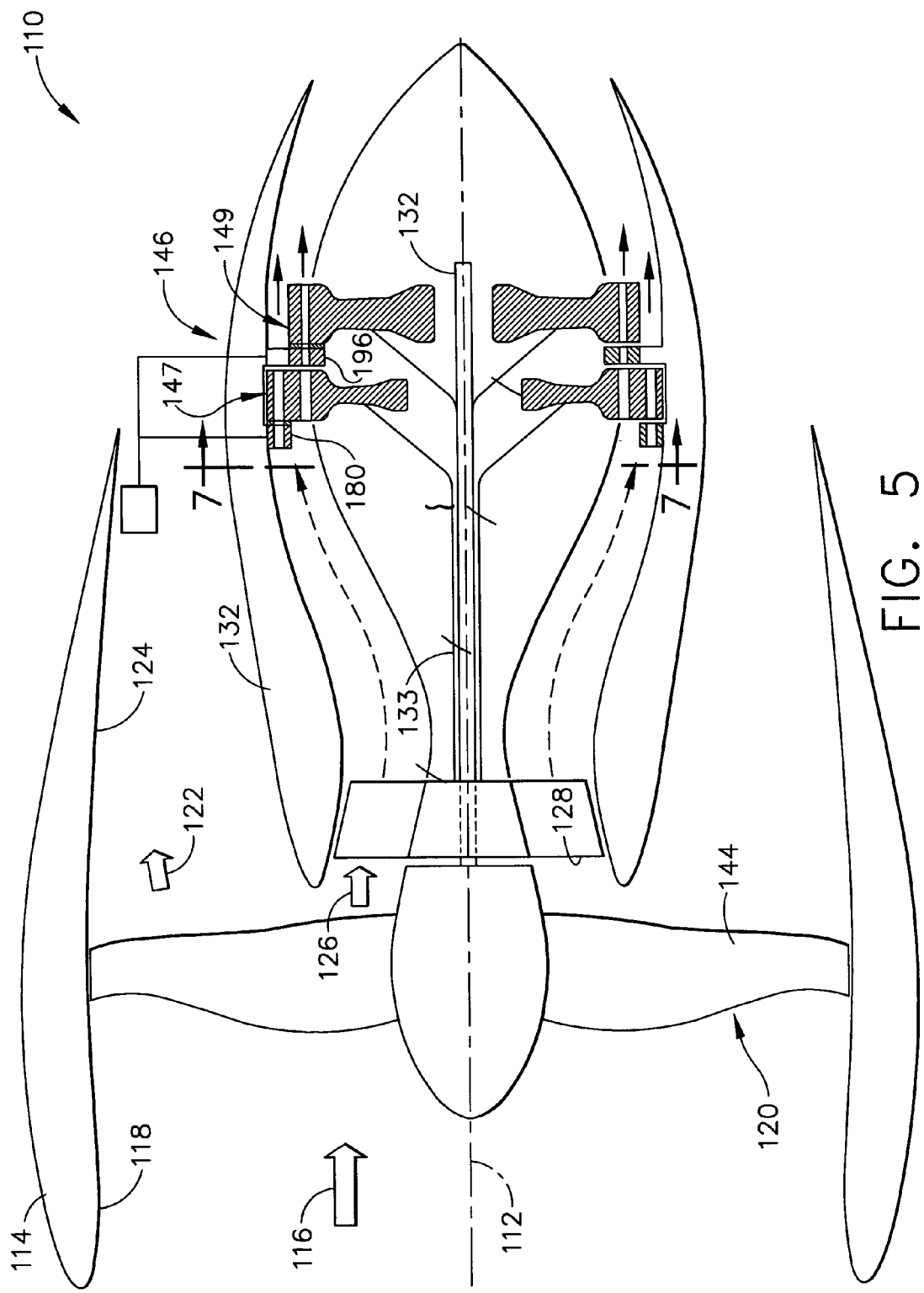
FIG. 5 is a sectional view of a gas turbine engine like that depicted in FIG. 1 including a pulse detonation system having a second exemplary embodiment.

A second embodiment for the pulse detonation system is depicted schematically in FIG. 5. More specifically, it will be seen that a gas turbine engine 110 has a longitudinal centerline axis 112 therethrough and preferably includes a nacelle 114 to assist in directing a flow of air (represented by arrow 116) through an inlet 118 to a fan section 120. Air flow 116 is then split downstream of fan section 120 so that a first portion (represented by arrow 122) flows through an outer duct 124 and a second portion (represented by arrow 126) is provided to a booster compressor 128. A first fan blade row 144 is preferably connected to a first drive shaft 132. It will be understood that booster compressor 128 preferably includes at least one stationary compressor blade row (see compressor blade rows 30, 40 and 42 of booster compressor 28) and at least one rotatable compressor blade row (see compressor blade rows 34, 36 and 38 of booster compressor 28) connected to a second drive shaft 133 and interdigitated with the stationary compressor blade row(s). First and second drive shafts 132 and 133, respectively, are powered by means of a pulse detonation system 146.

Figure 6:
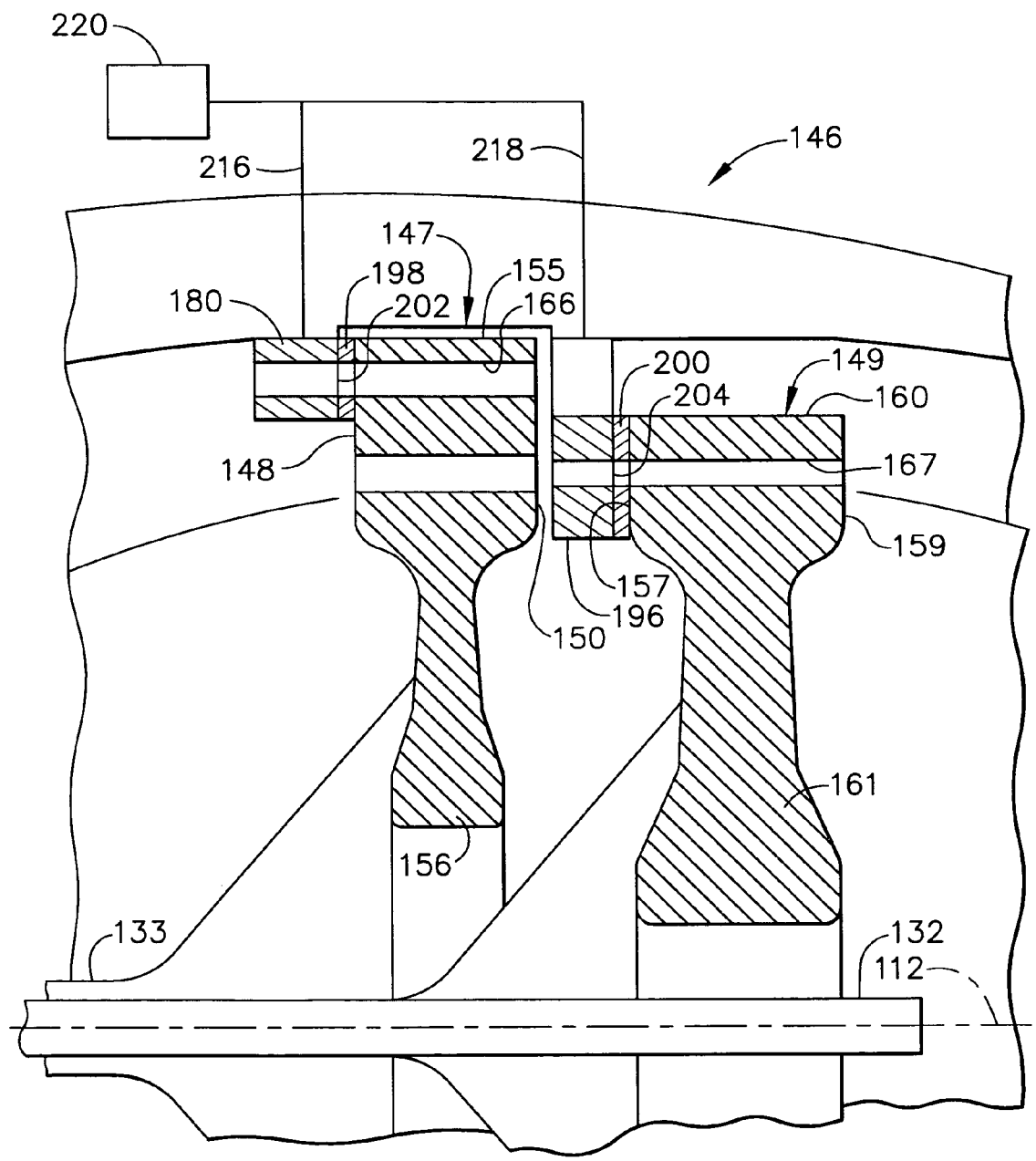
FIG. 6 is an enlarged, partial longitudinal cross-sectional view of the pulse detonation system depicted in FIG. 5.

As further seen in FIGS. 5 and 6, pulse detonation system 146 preferably includes a first rotatable cylindrical member 147 and a second rotatable member 149 which are coaxially oriented about longitudinal centerline axis 112. In the configuration shown, first rotatable cylindrical member 147 is located so as to be in a somewhat upstream axial position as compared to second rotatable member 149, as well as a somewhat outer radial position with respect to such second rotatable member 149. It will be appreciated that first rotatable cylindrical member 147 is preferably connected to second drive shaft 133 so as to power booster compressor 128 while second rotatable cylindrical member 149 is preferably connected to first drive shaft 132 so as to power fan section 120. In this way, second rotatable cylindrical member 149 is utilized to drive the component requiring the most torque.

It will be understood that pulse detonation system 146 will preferably initially power only second drive shaft 133 during a first designated condition of gas turbine engine 110 (e.g., start-up of gas turbine engine 110). Because second drive shaft 133 serves to cause the rotation of booster compressor 128, the much higher staring torque required by fan section 120 need not be extracted from pulse detonation system 146 during this first designated condition of gas turbine engine 110. Once booster compressor 128 rotates at a predetermined rotational speed (i.e., a second designated operating condition of gas turbine engine 110), pulse detonation system 146 is then preferably utilized to power first drive shaft 132 and cause rotation of fan section 120, as well as second drive shaft 133 and booster compressor 128. By powering second drive shaft 133 first, it will be appreciated that booster compressor 128 can supply the compressed air required by pulse detonation system 146 when the higher starting torque of fan section 120 is required. Due to their coaxial relation, first and second drive shafts 132 and 133 are able to be driven independently.

It will be understood that first and second rotatable cylindrical members 147 and 149 of gas turbine engine 110 preferably have the basic configuration of that shown and described in U.S. patent application Ser. No. 10/803,293 (entitled "Rotary Pulse Detonation System With Aerodynamic Detonation Passages For Use In A Gas Turbine Engine,"), U.S. patent application Ser. No. 10/422,314 (entitled "Rotating Pulse Detonation System For A Gas Turbine Engine"), or some combination thereof. Each of these applications is hereby incorporated by reference. Accordingly, FIG. 6 depicts first rotatable cylindrical member 147 as including a forward surface 148, an aft surface 150, and an outer circumferential surface 155. It will be noted that first rotatable cylindrical member 147 includes an integral middle portion which is connected to second drive shaft 133, but it will be understood that at least one separate disk member 156 may be provided to connect first rotatable cylindrical member 147 with drive shaft 133.

Similarly, second rotatable cylindrical member 149 of pulse detonation system 146 preferably includes a forward surface 157, an aft surface 159, and an outer circumferential surface 160. The direction of rotation for second rotatable cylindrical member 149 is preferably the same as for first rotatable cylindrical member 147. As depicted, second rotatable cylindrical member 149 preferably includes at least one separate disk member 161 to connect second rotatable cylindrical member 149 with drive shaft 132. It will be understood, however, that second rotatable cylindrical member 149 may include an integral middle portion which is connected to first drive shaft 132.

Figure 7:
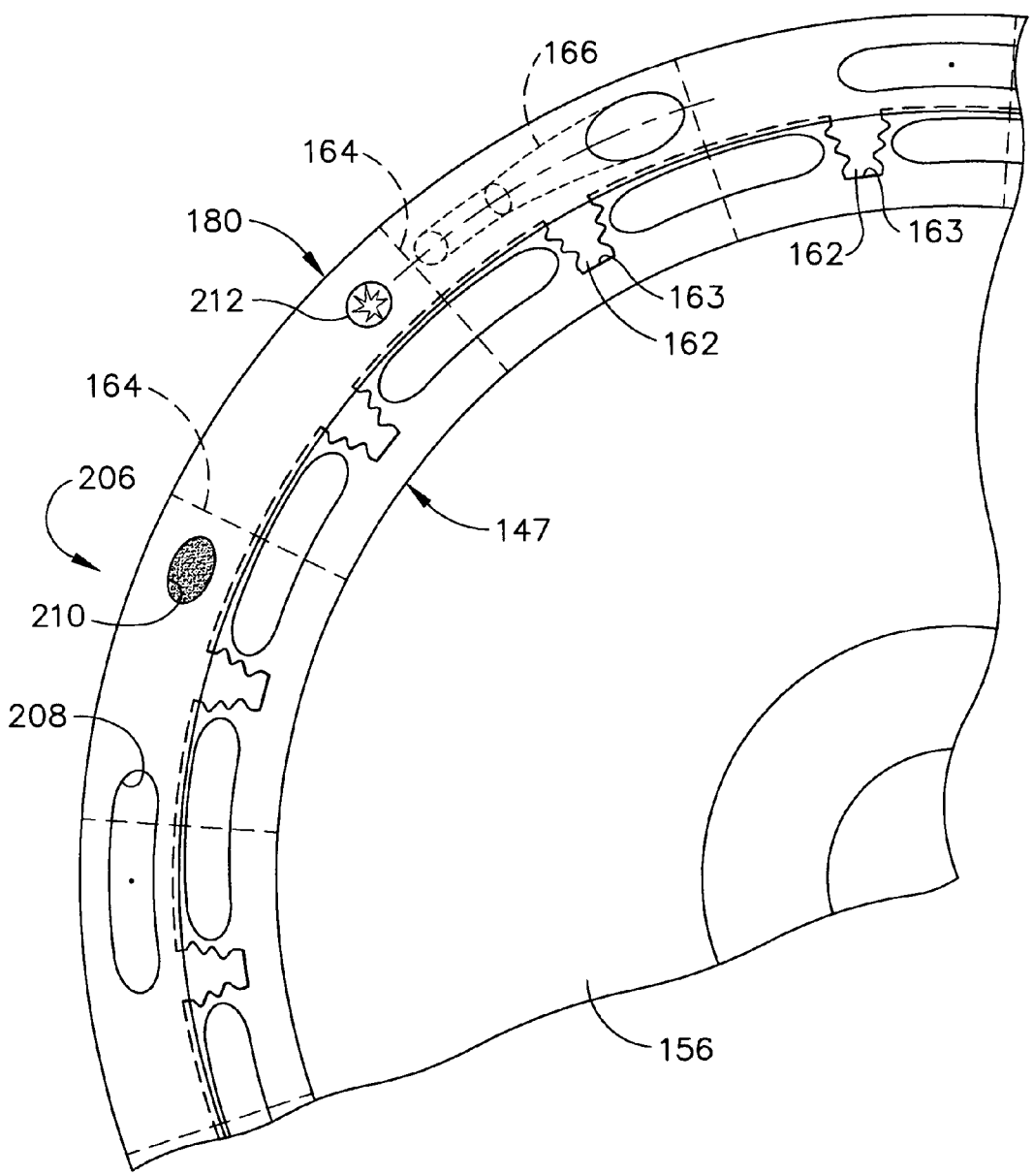
FIG. 7 is a front view of the pulse detonation system depicted in FIGS. 5 and 6.

In the instance when first and/or second rotatable cylindrical members 147 or 149 are connected to their respective disk members 156 and 161, it is preferred that such rotatable cylindrical member (as shown in FIG. 7 with respect to first rotatable cylindrical member 147) include a plurality of circumferentially spaced dovetail members 162 which mate with a like number of dovetail slots 163, respectively, formed in such disk member 156. It will be appreciated from FIG. 7 that first rotatable cylindrical member 147 is preferably formed by a plurality of annular segments 164 which include dovetail members 162. Such annular members 164 generally will include at least one detonation passage 166 therein depending on the circumferential spacing between detonation passages and the arcuate length of annular segments 164. It will be recognized, however, that not every annular segment 164 need include such a detonation passage, such as with respect to the circumferential spacing between groups of ports as described herein. In any event, assembly and disassembly of first rotatable cylindrical member 147 is simplified, with maintenance or replacement of only affected areas being required.

Figure 8:
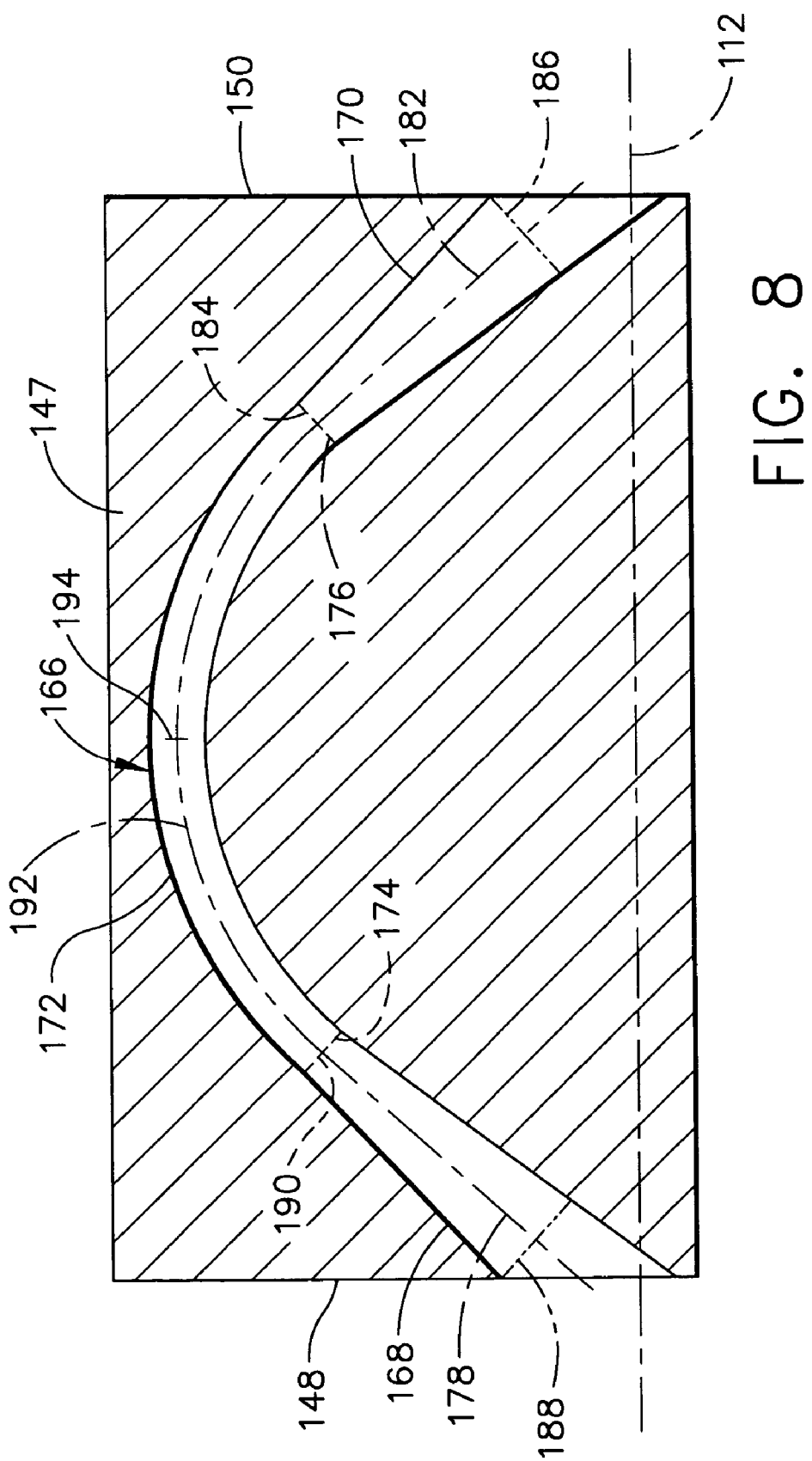
FIG. 8 is an enlarged, diagrammatic view of one of the detonation passages for the rotatable cylinders of the pulse detonation system depicted in FIGS. 5–7.

First and second rotatable cylindrical members 147 and 149 further include a plurality of detonation passages 166 and 167 disposed therethrough. As best shown in FIG. 8 with respect to first rotatable cylindrical member 147, each detonation passage 166 is preferably formed to include a leading portion 168 positioned at an upstream end adjacent forward surface 148, a trailing portion 170 positioned at a downstream end adjacent aft surface 150, and a middle portion 172 connecting leading portion 168 with trailing portion 170. It will be appreciated that a phantom line 174 is depicted to generally define the transition between leading portion 168 and middle portion 172, while a phantom line 176 is similarly depicted to generally define the transition between middle portion 172 and trailing portion 170. Of course, it will be understood that detonation passages 167 of second rotatable cylindrical member 149 may have the same configuration as set forth for detonation passages 166 of first rotatable cylindrical member 147.

It will further be appreciated from the '293 patent application that detonation passages 166 and 167 of first and second rotatable cylindrical members 147 and 149 may be configured so as to be oriented within a plane having a tangential and/or radial component thereto. Regardless, it will be appreciated that the orientation of leading portion 168 is such that a centerline 178 is substantially alignable vectorally with the flow emanating from a group of ports in a stator 180 as described more specifically herein. It will be appreciated, however, that the optimal angular orientation of leading portions 168 for detonation passages 166 is preferably determined by an analysis of the velocity vectors for inlet air and fuel supplied by the group of ports in light of the rotational velocity of first rotatable cylindrical member 147 over a range of operating conditions for the engine.

It will further be noted that a centerline 182 for trailing portion 170 of each detonation passage 166 is also preferably oriented at a designated angle so as to permit the combustion gases to exit aft surface 150 of first rotatable cylindrical member 147 in a manner to create a torque which causes first rotatable cylindrical member 147 to rotate. As evidenced by the figures, detonation passages 166 are preferably symmetrical so that leading portion 168 and trailing portion 170 are oriented in opposite directions at designated angles having substantially the same magnitude. It is understood, however, that the magnitude of such respective angles may be different and need not be substantially the same.

Each detonation passage 166 and 167 preferably has a substantially circular cross-section throughout the length of at least a portion thereof, although such cross-section may also be non-circular. It will be appreciated that a diameter of detonation passages 166 and 167 may be substantially constant. As depicted in FIG. 8, trailing portion 170 of such detonation passages 166 may have a diverging cross-section so as to have an increasing diameter from diameter 184 at phantom line 176 to a maximum diameter 186 at aft surface 150 of first rotatable cylindrical member 147. It will also be noted that leading portion 168 may have a converging cross-sectional area so that its diameter 188 at forward surface 148 of first rotatable cylindrical member 147 is greater than diameter 190 at phantom line 174. In this way, flow through and pressure within detonation passages 166 may be controlled for their desirable effects.

It will further be seen that middle portion 172 of each detonation passage 166 is configured to have a substantially constantly changing slope within its specified plane as it connects leading and trailing portions 168 and 170, respectively. As seen in FIG. 8, middle portion 172 is configured so that a centerline 192 therethrough is aligned with centerline 178 of leading portion 168 at a first end. Similarly, middle portion 172 is configured so that centerline 192 is aligned with centerline 182 of trailing portion 170 at a second end. Since leading portion 168 and trailing portion 170 are oriented in opposite directions, middle portion 172 will include a midpoint (defined by a phantom line 194) which transitions middle portion 172 from one direction to another (i.e., where the slope thereof is zero). Depending on the particular orientations of leading portion 168 and trailing portion 170 of detonation passages 166, centerline 192 at any given location will be oriented at a positive or negative angle. The range of slope for middle portion 172 will likewise depend upon the respective designated angles of leading portion 168 and trailing portion 170, respectively.

By configuring middle portion 172 in the manner described, it will be understood that changes in pressure occur therein so that the combustion gases formed by the detonation process in each detonation passage 166 and 167 work against an inner surface thereof to create a torque on first and second rotatable cylindrical members 147 and 149 and further contribute to their rotation. Thus, the torque created to rotate first and second rotatable cylindrical members 147 and 149 is a function of the orientation for middle portion 172, as well as the change in direction of leading portion 168 and trailing portion 170. The configuration of detonation passages 166 and 167 is therefore similar to the passages formed between adjacent blades of a turbine and functions in a similar manner. Moreover, the flow of air, fuel and combustion gases through detonation passages 166 and 167 is smooth due to the aerodynamic configuration thereof.

It is further preferred that detonation passages 166 and 167 of each detonation stage be symmetrically spaced circumferentially within first and second rotatable cylindrical members 147 and 149. The number of detonation passages 166 and 167 provided within first and second rotatable cylindrical members 147 and 149, respectively, is dependent upon several factors, including the designated angles of leading portion 168 and trailing portion 170, respectively, and a diameter of first and second rotatable cylindrical members 147 and 149. As noted herein, it is preferred that a plurality of replaceable annular segments 164 be connected to first rotatable cylindrical member 147 (e.g., via dovetail slots 163 formed in disk member 156), where each annular segment 164 typically includes at least one detonation passage 166 formed therein. Of course, detonation passages 166 and 167 may alternatively be formed in an integral rotatable cylindrical member.

Pulse detonation system 146 further includes first and second stators 180 and 196 which are configured in spaced arrangement with respect to forward surfaces 148 and 157 of first and second rotatable cylindrical members 147 and 149, respectively, as well as a portion of drive shafts 133 and 132. It will be seen that each stator 180 and 196 is substantially annular and first and second seal plates 198 and 200 are preferably positioned between forward surfaces 148 and 157 of first and second rotatable cylindrical members 147 and 149 and respective rear surfaces 202 and 204 of first and second stators 180 and 196 so as to prevent flow between ports.

As seen in FIG. 7 with respect to first rotatable cylindrical member 147, first stator 180 further includes at least one group of ports 206 formed therein. It will be understood that each port group 206 has an air port 208 in flow communication with a source of compressed air (e.g., compressed air flow 130 from booster compressor 128), a fuel port 210 in flow communication with a fuel source, and a port 212 having a device (not shown) associated therewith for initiating a detonation in detonation passages 166. It is contemplated that exemplary initiation devices may include an igniter (e.g., a high energy spark plug, a torch igniter having separate fuel and oxidizer, or a plasma jet igniter), a laser, or a shock focus device. The initiation device may be activated when port 212 is in communication with each detonation passage 166 so as to assist in producing a detonation wave in all detonation passages 166 or in accordance with a predetermined delay so that only certain detonation passages 166 are utilized for this purpose. A control device (not shown) is preferably provided to control the initiation of detonations within detonation passages 166. Although not particularly shown by a separate figure, it will be understood that second stator 196 associated with second rotatable cylindrical member 149 is preferably configured in like manner to that described for first stator 180.

It will be understood that detonation cycles are performed in detonation passages 166 and 167 so that combustion gases following detonation waves through detonation passages 166 and 167 during such detonation cycles both interface with an inner surface of middle portion 172 and exit aft surfaces 150 and 159 of first and second rotatable cylindrical members 147 and 149 to create a torque that causes first and second rotatable cylindrical members 147 and 149 to rotate.

It will be appreciated that prior to the occurrence of any detonation cycles within detonation passages 166 and 167, first and second rotatable cylindrical members 147 and 149 are preferably driven so as to obtain predetermined rotational speeds. This is caused by supplying compressed air to detonation passages 166 and 167 via air ports 208 at a relatively higher pressure than the pressure at which air is discharged from detonation passages 166 and 167. Once the predetermined rotational speeds of first and second rotatable cylindrical members 147 and 179 are achieved, fuel is then supplied to detonation passages 166 and 167 in accordance with the designated engine conditions described hereinabove.

It will be appreciated that a plurality of port groups 206 may be provided in first and second stators 180 and 196, wherein a plurality of detonation cycles are able to occur in each detonation passage 166 and 167 during a revolution of first and second rotatable cylindrical members 147 and 149. Such port groups 206 are preferably spaced symmetrically around first and second stators 180 and 196, although it is not required. Moreover, while the number of port groups 206 may be equivalent to the number of detonation passages 166 and 167 provided in first and second rotatable cylindrical members 147 and 149, there may be more or less as desired. In any event, a predetermined amount of circumferential space is provided between each port group 206, as well as between each individual port thereof Such circumferential spacing may be equivalent to a replaceable segment 164 which does not include a detonation passage therethrough.

Another aspect of pulse detonation system 146 is the manner in which fuel is supplied to fuel ports 210 for injection into detonation passages 166 and 167. In one embodiment, first and second fuel manifolds 216 and 218 are provided upstream of first and second stators 180 and 196 (see FIG. 5). Fuel manifolds 216 and 218 are preferably in flow communication with a fuel supply (not shown) at one end and is also in flow communication with fuel ports 210 at a second end so that fuel is supplied thereto as part of the detonation cycle in detonation passages 166 and 167 described herein. A device 220 is provided to control the injection of fuel from fuel manifolds 216 and 218.

Figure 9:
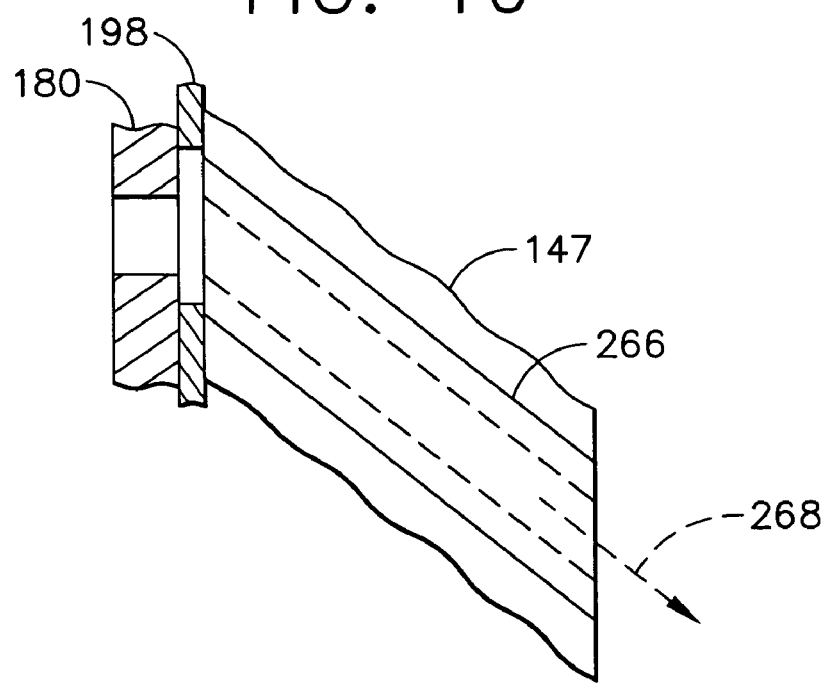
FIG. 9 is an enlarged, diagrammatic view of an alternate configuration for one of the detonation passages of the pulse detonation system depicted in FIGS. 5–7; and, FIG. 10 is a partial sectional view of a second alternate configuration for one of the detonation passages of the pulse detonation system depicted in FIGS. 5–7.

It will further be understood that the configuration of detonation passages 166 and 167 of first and second rotatable cylindrical member 147 and 149 need not be limited to that described hereinabove. Rather, as shown in FIG. 9 with respect to detonation passage 266 and described in the '314 patent application, detonation passages 266 of first rotatable cylindrical member 147 may be substantially linear and have a longitudinal axis 268 extending through at least a portion thereof at a circumferential angle to longitudinal centerline axis 112. Such angle is preferably an acute angle which preferably is within a range of approximately 20–85° and optimally within a range of approximately 40–75°. It will be appreciated, however, that the optimal angular orientation of detonation passages 266 is preferably determined by an analysis of the velocity vectors for inlet air supplied by air port 208 and fuel from fuel port 210 in light of the rotational velocity of first rotatable cylindrical member 147 over a range of operating conditions for the engine. Accordingly, detonation passages 266 have an eccentric orientation with respect to longitudinal centerline axis 112. It will be understood that detonation passages 266 may also be oriented at a radial angle to longitudinal centerline axis 112 so long as the circumferential angle is maintained.

Figure 10:
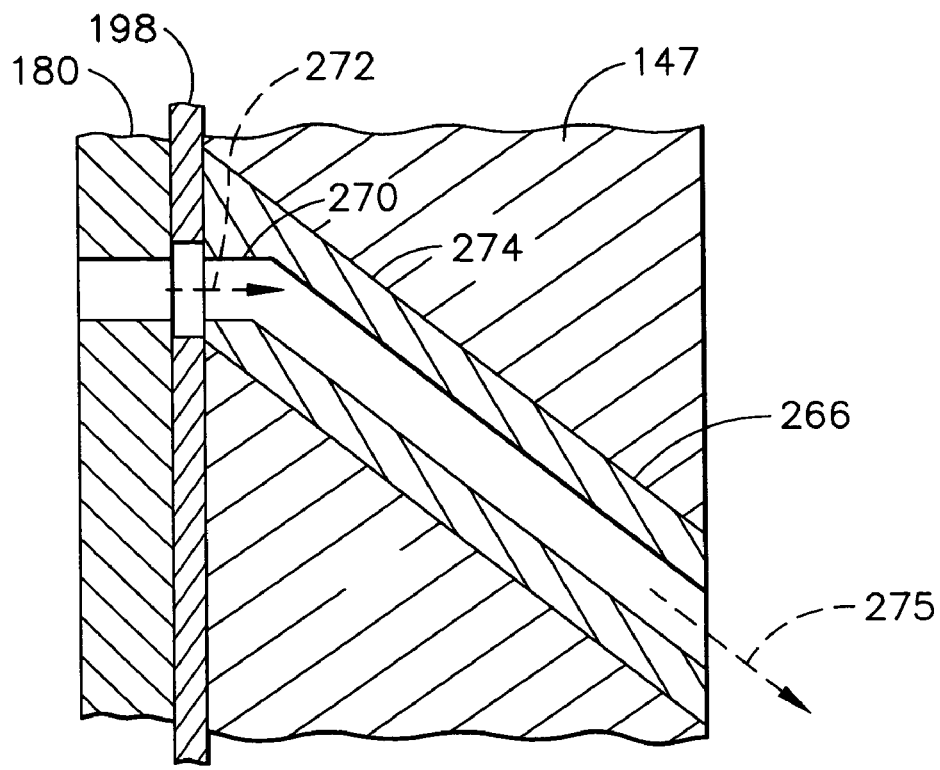

Detonation passages 266 may be substantially non-linear so long as at least a portion thereof maintains the eccentric orientation with respect to longitudinal centerline axis 112. In this regard, it will be seen from FIG. 10 that detonation passage 266 may include a first portion 270 including a longitudinal axis 272 extending therethrough oriented substantially parallel to longitudinal centerline axis 112 and a second portion 274 in flow communication with first portion 270 including a longitudinal axis 275 extending therethrough which is oriented at a predetermined circumferential angle to longitudinal axis 272. Accordingly, second portion 274 of detonation passages 266 are likewise oriented at a designated angle to longitudinal centerline axis 112 and is preferably in a range of approximately 20–85° or optimally in a range of approximately 40–75° as described above. Although not shown, detonation passages 266 may be curved so as to obtain a similar eccentric orientation with respect to longitudinal centerline axis 112. It will be understood that detonation passages having an alternative configuration like that described for detonation passages 266 may be employed instead of the configuration for detonation passages 167 in second rotatable cylindrical member 149.

In accordance with the description of pulse detonation system 46 for gas turbine engine 10, it will be appreciated that a method of independently powering separate drive shafts in a gas turbine engine is also associated therewith. Such method, with respect to gas turbine engine 10, preferably includes the step of providing a first rotatable member (e.g., first rotatable ring member 56) with a plurality of detonation areas associated therewith (i.e., at least one stage 58 of circumferentially spaced detonation ducts 66). Another step of the method is connecting first rotatable member to a second drive shaft 33. The next step preferably includes providing a second rotatable member (e.g., second rotatable ring member 57) with a plurality of detonation areas associated therewith and connecting such second rotatable member to a first drive shaft 32. Thereafter, the method includes the step of producing a torque on the first rotatable member via the performance of pulse detonation cycles in the detonation areas thereof during a first designated condition of gas turbine engine 10. An additional step is producing a torque on the second rotatable member via the performance of pulse detonation cycles in the detonation areas thereof during a second designated condition of gas turbine engine 10.

In this way, a detonation cycle is performed in each detonation duct 66 and 67 in order to produce a torque which causes ring members 56 and 57 to rotate, as well as drive shafts 32 and 33. Performance of the detonation cycle further includes the steps of periodically supplying compressed air to detonation ducts 66 and 67, subsequently injecting fuel into detonation ducts 66 and 67, and subsequently initiating a detonation wave in detonation ducts 66 and 67. These steps involve aligning detonation ducts 66 and 67 of each detonation stage in a predetermined timing and sequence with an air port 50 in air inlet duct 48, a fuel injector 52 in circumferentially spaced relation to air port 50, and a device 54 in circumferentially spaced relation to fuel injector 52 for initiating a detonation wave.

With respect to pulse detonation system 146 of gas turbine engine 110, a similar method of independently powering separate drive shafts in a gas turbine engine is also associated therewith Such method, with respect to gas turbine engine 110, preferably includes the step of providing a first rotatable member (e.g., first rotatable cylindrical member 147) with a plurality of detonation areas associated therewith (i.e., at least one stage of circumferentially spaced detonation passages 166). Another step of the method is connecting first rotatable cylindrical member 147 to a second drive shaft 133. The next steps preferably include providing a second rotatable member (e.g., second rotatable cylindrical member 149) with a plurality of detonation areas associated therewith (i.e., at least one stage of circumferentially spaced detonation passages 167) and connecting such second rotatable cylindrical member 149 to first drive shaft 132. Thereafter, the method includes the step of producing a torque on first rotatable cylindrical member 147 via the performance of pulse detonation cycles in the detonation areas thereof during a first designated condition of gas turbine engine 110. An additional step is producing a torque on the second rotatable cylindrical member 149 via the performance of pulse detonation cycles in the detonation areas thereof during a second designated condition of gas turbine engine 110.

In this way, a detonation cycle is performed in each detonation passage 166 and 167 in order to produce a torque which causes first and second rotatable cylindrical members 147 and 149 to rotate, as well as first and second drive shafts 132 and 133. Performance of the detonation cycle further includes the steps of periodically supplying compressed air to detonation passages 166 and 167, subsequently injecting fuel into detonation passages 166 and 167, and subsequently initiating a detonation wave in detonation passages 166 and 167. These steps involve aligning detonation passages 166 and 167 of each detonation stage in a predetermined timing and sequence with an air port 208 in first and second stators 180 and 196, a fuel injector 210 in circumferentially spaced relation to air port 208, and a device within initiation port 212 in circumferentially spaced relation to fuel injector 210 for initiating a detonation wave.

Having shown and described the preferred embodiment of the present invention, further adaptations of the gas turbine engine and the pulse detonation systems can be accomplished by appropriate modifications by one of ordinary skill in the art without departing from the scope of the invention. Moreover, it will be understood that various configurations of pulse detonation systems is within the scope of the present invention.

What is claimed is:

1. A gas turbine engine having a longitudinal centerline axis therethrough, comprising:
   (a) a fan section at a forward end of said gas turbine engine including at least a first fan blade row connected to a first drive shaft;
   (b) a booster compressor positioned downstream of said fan section, said booster compressor including a first compressor blade row and a second compressor blade row connected to a second drive shaft and interdigitated with said first compressor blade row; and,
   (c) a pulse detonation system connected to and independently powering said first and second drive shafts.

2. The gas turbine engine of claim 1, wherein said pulse detonation system powers only said second drive shaft during a first designated condition of said gas turbine engine.

3. The gas turbine engine of claim 1, wherein said pulse detonation system powers both said first drive shaft and said second drive shaft during a second designated condition of said gas turbine engine.

4. The gas turbine engine of claim 3, wherein said first drive shaft is powered after said booster compressor rotates at a predetermined rotational speed.

5. The gas turbine engine of claim 3, wherein said second drive shaft is powered prior to said first drive shaft.

6. The gas turbine engine of claim 1, wherein a starting torque required to power said booster compressor is less than a starting torque required to power said fan section.

7. The gas turbine engine of claim 1, said pulse detonation system further comprising a first rotatable section for powering said second drive shaft.

8. The gas turbine engine of claim 7, said pulse detonation system further comprising a second rotatable section for powering said first drive shaft.

9. The gas turbine engine of claim 8, wherein said first rotatable section of said pulse detonation system is located upstream of said secondary section thereof.

10. The gas turbine engine of claim 8, wherein said first rotatable section of said pulse detonation system rotates independently of said second section thereof.

11. The gas turbine engine of claim 7, wherein said first rotatable section of said pulse detonation system includes a single stage for powering said second drive shaft.

12. The gas turbine engine of claim 8, wherein said second rotatable section of said pulse detonation system includes a plurality of stages for powering said first drive shaft.

13. The gas turbine engine of claim 12, wherein certain stages of said second rotatable section for said pulse detonation system have detonation cycles performed therein for a particular operating condition of said gas turbine engine.

14. The gas turbine engine of claim 1, further comprising a turbine positioned aft of and in flow communication with said pulse detonation system, wherein said turbine is also utilized to power said first drive shaft.

15. The gas turbine engine of claim 1, said pulse detonation system further comprising:
   (a) an air inlet duct in flow communication with said booster compressor, said air inlet duct including at least one port formed therein for permitting compressed air to flow therethrough;
   (b) a fuel injector mounted to said air inlet duct in circumferentially spaced relation to each said port;
   (c) a device mounted to said air inlet duct in circumferentially spaced relation to each said fuel injector for initiating a detonation wave;
   (d) a first rotatable ring member positioned in coaxial relation around a first portion of said air inlet duct, said first ring member including at least one stage of detonation ducts disposed therein, wherein said first ring member is connected to said second drive shaft; and,
   (e) a second rotatable ring member positioned in coaxial relation around a second portion of said air inlet duct, said second ring member including at least one stage of detonation ducts disposed therein, wherein said second ring member is connected to said first drive shaft;
   wherein detonation waves are produced in said detonation stage of said first rotatable ring member during said first designated condition of said gas turbine engine so that combustion gases following each said detonation wave create a torque which causes said first ring member to rotate and power said second drive shaft.

16. The gas turbine engine of claim 15, wherein detonation waves are produced in at least certain stages of said second rotatable ring member during a second designated condition of said gas turbine engine so that combustion gases following each said detonation wave create a torque which causes said second ring member to rotate and power said first drive shaft.

17. The gas turbine engine of claim 1, said pulse detonation system further comprising:

(a) a first rotatable cylindrical member having a forward surface, an aft surface, and an outer circumferential surface, said first rotatable cylindrical member including at least one stage of circumferentially spaced detonation passages disposed therethrough, wherein said first rotatable cylindrical member is connected to said second drive shaft;

(b) a second rotatable cylindrical member located adjacent said first rotatable cylindrical member, said second rotatable cylindrical member having a forward surface, an aft surface, and an outer circumferential surface and including at least one stage of circumferentially spaced detonation passages disposed therethrough, wherein said second rotatable cylindrical member is connected to said first drive shaft;

(c) a first stator configured-in spaced arrangement with said first rotatable cylindrical member, said first stator including at least one group of ports formed therein alignable with said detonation passages as said first cylindrical member rotates; and, (d) a second stator configured in spaced arrangement with said second rotatable cylindrical member, said second stator including at least one group of ports formed therein alignable with said detonation passages as said second cylindrical member rotates;

wherein detonation cycles are performed in said detonation stage of said first rotatable cylindrical member during a first designated condition of said gas turbine engine to create a torque which causes said first rotatable cylindrical member to rotate and power said second drive shaft.

18. The gas turbine engine of claim 17, wherein detonation cycles are performed in at least certain detonation stages of said second rotatable cylindrical member during a second designated condition of said gas turbine engine to create a torque which causes said second rotatable cylindrical member to rotate and power said first drive shaft.

19. The gas turbine engine of claim 18, said detonation passages in said first and second rotatable cylindrical members further comprising:

(a) a leading portion positioned adjacent said forward surface of said cylindrical member, said leading portion having a centerline therethrough oriented at a designated angle to an axis extending substantially parallel to said longitudinal centerline axis within a specified plane;

(b) a trailing portion positioned adjacent said aft surface of said cylindrical member, said trailing portion having a centerline therethrough oriented at a designated angle to said axis within said specified plane; and, (c) a middle portion connecting said leading and trailing portions, said middle portion having a centerline therethrough with a substantially constantly changing slope in said specified plane.

20. The gas turbine engine of claim 17, said detonation passages of said first and second rotatable cylindrical members further comprising at least a portion thereof with a longitudinal axis extending therethrough which is oriented at a circumferential angle to said longitudinal centerline axis.

21. A method of independently powering separate drive shafts in a gas turbine engine by means of a pulse detonation system, comprising the following steps:

(a) providing a first rotatable member with a plurality of detonation areas associated therewith;

(b) connecting said first rotatable member to a first drive shaft of said gas turbine engine;

(c) providing a second rotatable member with a plurality of detonation areas associated therewith;

(d) connecting said second rotatable member to a second drive shaft of said gas turbine engine;

(e) producing a torque on said first rotatable member via the performance of pulse detonation cycles in said detonation areas thereof during a first designated condition of said gas turbine engine; and, (f) producing a torque on said second rotatable member via the performance of pulse detonation cycles in said detonation areas thereof during a second designated condition of said gas turbine engine.

* * * * *